US007676209B2

(12) United States Patent
Salmenkaita et al.

(10) Patent No.: US 7,676,209 B2
(45) Date of Patent: Mar. 9, 2010

(54) METHOD AND SYSTEM FOR ALLOCATING CHANNELS IN A CELLULAR COMMUNICATION NETWORK

(75) Inventors: Matti Salmenkaita, Málaga (ES); Jose Gimenez, Málaga (ES); Pablo Tapia, Málaga (ES)

(73) Assignee: Nokia Corporation, Espoo (FI)

( * ) Notice: Subject to any disclaimer, the term of this patent is extended or adjusted under 35 U.S.C. 154(b) by 373 days.

(21) Appl. No.: 10/539,780

(22) PCT Filed: Dec. 20, 2002

(86) PCT No.: PCT/IB02/05573

§ 371 (c)(1),
(2), (4) Date: Nov. 14, 2005

(87) PCT Pub. No.: WO2004/057900

PCT Pub. Date: Jul. 8, 2004

(65) Prior Publication Data

US 2006/0160542 A1 Jul. 20, 2006

(51) Int. Cl.
*H04B 1/10* (2006.01)
(52) U.S. Cl. .................. 455/296; 455/450; 455/464; 455/114.2; 455/222; 455/223
(58) Field of Classification Search ............ 455/450, 455/464, 515, 114.2, 219, 222, 223, 296; 370/335, 320, 252
See application file for complete search history.

(56) References Cited

U.S. PATENT DOCUMENTS 5,528,596 A * 6/1996 Fisher et al. ............. 370/347
6,163,698 A 12/2000 Leitch et al.
7,099,372 B2 * 8/2006 Nieczyporowicz et al. .. 375/140
7,190,683 B2 * 3/2007 Giallorenzi et al. ......... 370/335
7,197,303 B2 * 3/2007 Sakai ....................... 455/423
7,336,956 B2 2/2008 Halonen et al.
2002/0044614 A1 * 4/2002 Molnar et al. ............. 375/346

FOREIGN PATENT DOCUMENTS

WO     WO 02/054809        7/2002

OTHER PUBLICATIONS

Salmenkaita et al, "Optimizing the GSM/EDGE air interface for multiple services with dynamic frequency and channel assignment." In: 2002 IEEE 56th Vehicular Technology Conference, 2002. Proceedings. VTC 2002. Sep. 24-28, 2002. vol. 4, pp. 2215-2219.

* cited by examiner

*Primary Examiner*—Vincent P Harper
*Assistant Examiner*—Fred A Casca
(74) *Attorney, Agent, or Firm*—Alston & Bird LLP

(57) ABSTRACT

A method of channel allocation in a cellular communication network wherein a radio channel is to be selected for establishment of a connection in an environment with potentially interfering signals, the method comprising: establishing a radio channel candidate; processing the radio channel candidate with potentially interfering signals and calculating a carrier to interference ratio (CIR) for the selected carrier frequency of the radio channel candidate and the potentially interfering signals; calculating a dominant interference ratio (DIR) being the ratio of the strongest potentially interfering signal with respect to the other potentially interfering signals; and using criteria based on at least one of the dominant interference ratio and the carrier to interference ratio in a selection process for selecting a channel for the connection to be established.

16 Claims, 3 Drawing Sheets

METHOD AND SYSTEM FOR ALLOCATING CHANNELS IN A CELLULAR COMMUNICATION NETWORK

The present invention relates to a method and system for allocating channels in a cellular communication network.

Dynamic frequency and channel assignment (DFCA) is a feature of existing cellular communications networks which is normally implemented in the base sub-station (BSS) of base station controller (BSC). The feature provides capacity gains and operational simplicity by dynamically allocating channels in GSM networks.

It also provides an air interface resource management in which the resources are used for each connection based on the quality of service (QoS) required by the connection in question. For a service, such as a call, data connection or the like, a parameter (Quality of Service, QoS) describing the quality of the service exists that can be defined or has already been defined in advance and that can be indicated as a carried to interference (C/I) ratio or guaranteed throughput, for instance, which during a certain time moves in one direction. From the available channels, the channel is selected which as well as possible meets the requirements set for said service. For different services, parameters of different level describing the quality of the service exist, whereby channels having a lower C/I level can primarily be allocated for voice communication, for instance, and channels having a higher C/I level are correspondingly primarily allocated for data services, for instance.

The DFCA radio resource management system maintains dynamically a matrix based on the quality of the connection (C/I level) on all possible channels (for instance a combination of time-slot and frequency) which can be allocated during the establishment of each connection. This matrix provides a possibility to allocate a channel having the C/I level best suited for use on the connection in question. For instance, if a mobile user makes a VoIP call whose predefined ideal service level is C/I=12, a combination of frequency and time-slot would be selected (for instance in a base station controller) which provides a channel whose C/I level is preferably higher than or equal to the ideal level of said service.

This is achieved by a method in which a channel is allocated to a connection being established, in which channel frequencies of a mobile allocation list are used by indicating a mobile allocation index offset to the list. In addition, a one-way or two-way interference measurement algorithm is used or a two-way interference measurement algorithm extended by an intra-cell handover (HO), with which the channel to be used will always be allocated from a C/I range which meets the quality requirements set for a connection of the service in question. Two way interference measurement methods in particular are characterised in that if the channel used for the connection is located in the desired C/I range between certain limit values, other channels used later do not change the C/I level of said connection in such a manner that the connection would move outside the desired C/I range. A two-way interference measurement method extended by an intra-cell HO in particular is characterised in that if a new connection, trying to obtain a channel from within the desired C/I range on its serving channel, does not find a suitable channel from any of the free time-slots, a channel for the new connection is searched for within said C/I range among the channels already used by other connections. A C/I based HO algorithm transfer a channel from a second connection to the new connection to be established, if a new channel meeting the quality requirements set for said second connection can be found for said second connection from said C/I range.

The time-slots of the base stations are synchronised. This means that a certain time-slot (TS) of a transceiver (TRX) is only interfered by corresponding time-slots of the transceivers (TRX) in the neighbouring cells. Cyclic frequency hopping is used to achieve frequency diversity and only one frequency hopping list is needed for the entire network, but more than one list can also be used.

In general terms, the DFCA is implemented as a method for allocating a radio channel in a communications network comprising at least one base station (BTS) which defines a cell, and mobile stations in the area of said cell, which communicate with said base station on radio channels, in which method neighbouring cell signal level measurements from MS and real time neighbouring cells channel occupancy information is collected so the most suitable radio channel from the said cell is finally allocated.

A number of different dynamic channel allocation schemes exist, some of which rely on a selection based on the reduction of interference in an optimised manner across the network, and some of which take into account other criteria for the selection of channels.

Currently, there also exists interference cancellation techniques which can provide significant link level gains, but these gains are highly dependent on the nature of the interference and other factors. Currently, dynamic channel allocation schemes do not fully take into account the link gain improvements that can be obtained by the use of interference cancellation techniques.

It is an aim of the present invention to provide a channel allocation scheme which can extract the benefit of interference cancellation techniques.

In the present specification a radio channel is established using a suitable combination of a time-slot and a radio frequency (as specified in a GSM system).

According to an aspect of the invention there is provided a method of channel allocation in a cellular communication network wherein a radio channel is to be selected for establishment of a connection in an environment with potentially interfering signals, the method comprising: establishing a radio channel candidate; processing the radio channel candidate with potentially interfering signals and calculating a carrier to interference ratio (CIR) for the selected carrier frequency of the radio channel candidate and the potentially interfering signals; calculating a dominant interference ratio (DIR) being the ratio of the strongest potentially interfering signal with respect to the other potentially interfering signals; and using criteria based on at least one of the dominant interference ratio and the carrier to interference ratio in a selection process for selecting a channel for the connection to be established.

The method is particularly useful where the radio channel candidate and potentially interfering signals have been processed using an interference cancellation technique. In that case, the dominant interference ratio is used to establish an indication as to the gain provided by the interference cancellation technique, that gain being used to establish a criteria for channel selection.

The interference cancellation gain can be used to modify an estimate of the carrier to interference ratio before using the carrier to interference ratio as a basis for criteria in the channel selection process. One of the criteria used in this selection process can be the maximum value of the minimum difference between the calculated carrier to interference ratio and a target carrier to interference ratio.

Another of the criteria used in the selection process can be the average dominant interference ratio taken over a set of n connections which could be interfered with by the connection to be established.

The gain provided by the interference cancellation technique can be established from the dominant interference ratio using a predefined function.

Another aspect of the invention provides a system for channel allocation in a cellular communication network wherein a radio channel is to be selected for establishment of a connection in an environment with potentially interfering signals, the system comprising: means for establishing a radio channel candidate; means for processing the radio channel candidate with potentially interfering signals and calculating a carrier to interference ratio (CIR) based on the selected carrier frequency of the radio channel candidate and the potentially interfering signals; and means for calculating a dominant interference ratio being the ratio of the strongest interfering signal with respect to the potentially interfering-signals, the system further comprising means for implementing a selection process for selecting a channel for the connection to be established using criteria based on at least one of the dominant interference ratio and the carrier to interference ratio.

As described more fully in the following, the embodiment of the invention provides a way of evaluating available radio channels based on criteria that takes into account link gain provided by interference cancellation techniques. In the preferred embodiment, channel selection criteria are discussed that aim for maximisation of the interference cancellation gains and thereby maximises network capacity. The invention is applicable to any channel allocation methods that utilise estimation of carrier to interference ratios based on real time or quasi-real time knowledge of the radio channel usage in the network. An example of this is the existing dynamic frequency and channel assignment network feature discussed above.

As described in the following embodiments, the dominant interference ratio and the carrier to interference ratio is calculated for each available radio channel within a dynamic channel assignment functionality. The knowledge of the DIR and CIR is then utilised in dynamic channel allocated decisions in a way that takes the maximum benefit from any interference cancellation techniques which are used on the link.

For a better understanding of the present invention and to show how the same may be carried into effect, reference will now be made by way of example to the accompanying drawings, in which.

Figure 1:
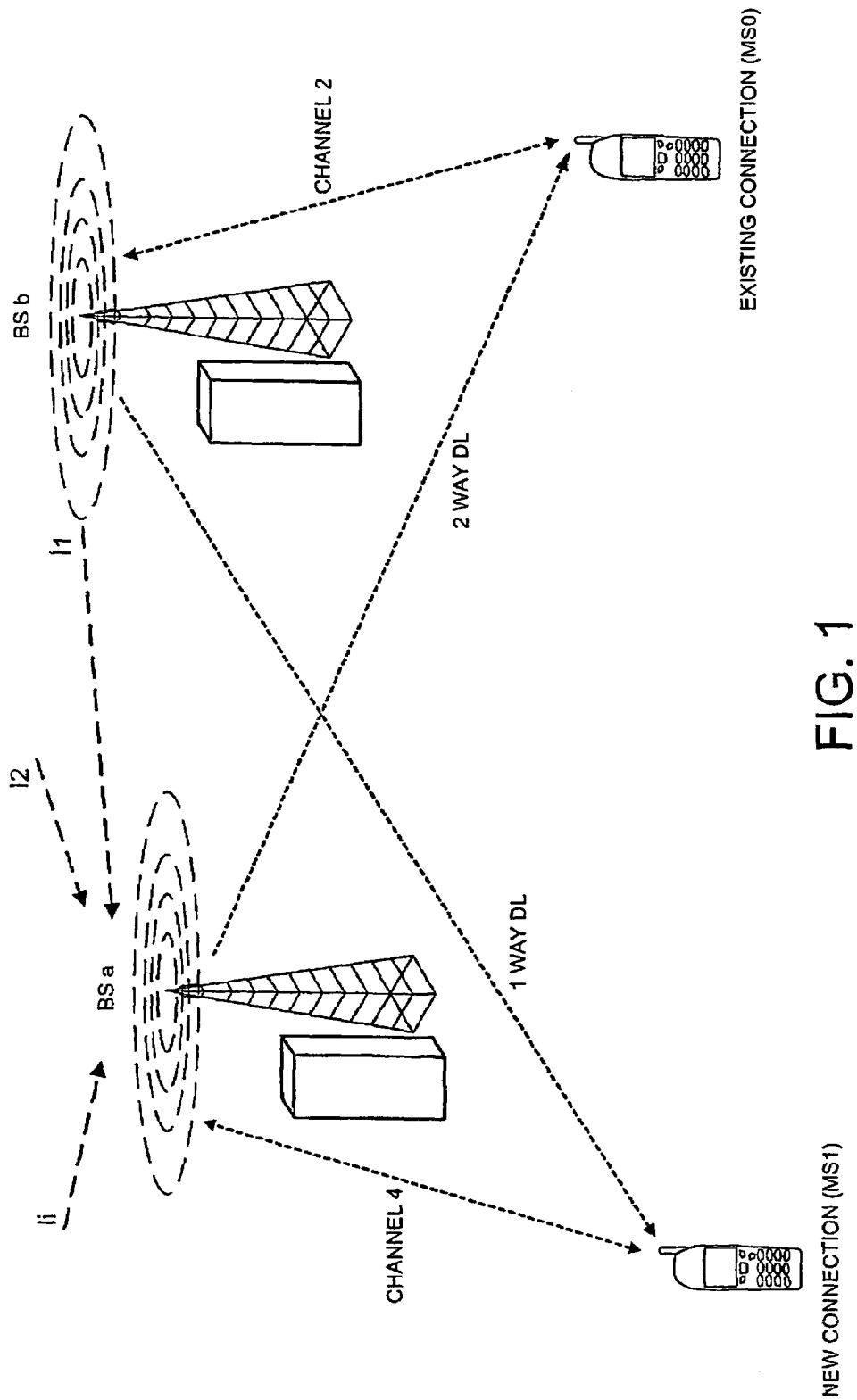
FIG. 1 is a schematic diagram illustrating two base stations with two mobile stations.

FIG. 1 illustrates part of a cellular communications network in which two mobile stations are being served by two different base stations (BSa, BSb). Of course, in practice, there will be multiple base stations organised to serve multiple cells in a cellular network, and many mobile stations using the network. FIG. 1 illustrates a base station BSb in communication with a first mobile station MS0 via an established communication channel 2. A further communication channel 4 is to be established between the base station BSa and a second mobile station MS1. Due to other activity in the network, the base station BSa is affected by a number of other potentially interfering signals, which are labelled I1, I2, ... Ii in FIG. 1. Similarly, the mobile stations are affected by interfering signals. These represent signals from other mobile users and/or base stations in the network. There is also interference from noise in the network.

The purpose of the system discussed herein is to select a channel as the communication channel 4, reducing as far as possible the effects of interference across the network. In the following discussion, one-way interference refers to incoming interference generated by other ongoing connections to a radio channel candidate, that is a radio channel which is being considered for selection to provide the communication channel 4. In the example of FIG. 1, this is the interference constituted by the other signals I1, I2, ... Ii (and the signal coming from BSb). Two-way interference refers to the outgoing interference that would be generated by the new connection impacting an ongoing connection if that particular radio channel candidate was used to establish the new connection channel 4. In this case, this would be the effect of the new channel 4 on the established channel 2 in FIG. 1. Only downlink interference sources are shown in FIG. 1 as the interference cancellation techniques discussed herein are applicable for downlink (from BS to MS). Uplink interference is taken into account for CIR estimations, but not in DIR calculations.

Dynamic frequency and channel assignment (DFCA) is an existing network feature provided by a base station sub-system BSS in a base station controller BSC which dynamically allocates channels in GSM networks. That is, channels are allocated by the base station controller BSC to incoming mobile stations, in a manner such as to reduce the overall interference in the network. In addition, channels for existing links can be dynamically altered by the DFCA feature if that will help in reducing overall interference. The system described herein adds to the existing DFCA functionality the concept of using the dominant interference ratio (DIR) in the channel selection process. The dominant interference ratio is defined as the ratio of the signal level of the strongest interferer and the sum of the signal levels of the other interfering signals and the noise level. This is expressed as in Equation 1 below:

$$DIR = \frac{I_{dom}}{\sum I - I_{dom} + N} \quad [1]$$

where $I_{dom}$ is the signal level of the dominant interfering signal and $\Sigma I$ is the sum of all of the interfering signal levels and N is the background noise level.

Figure 2:
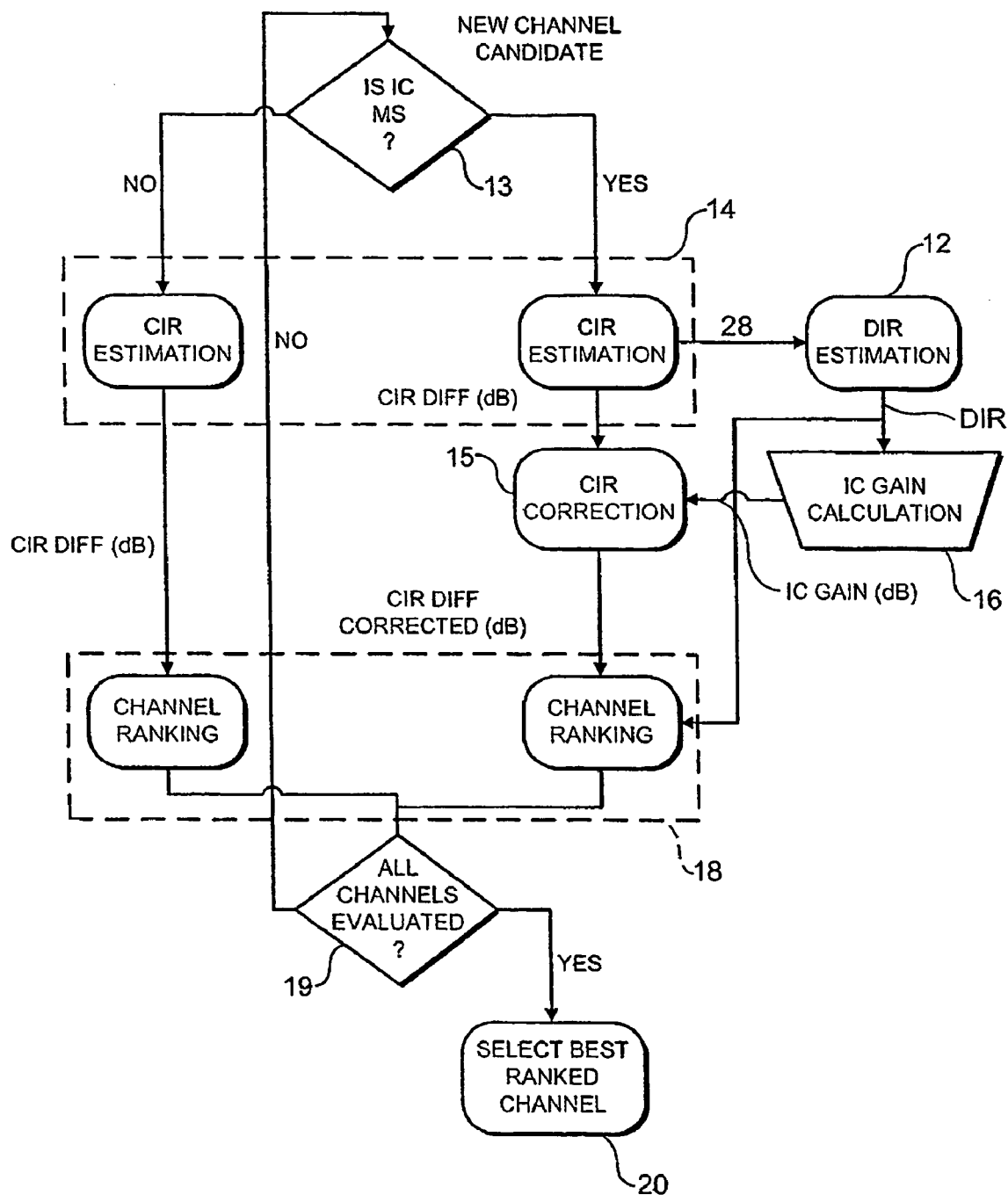
FIG. 2 is a schematic block diagram of a channel selection scheme.

FIG. 2 is a block diagram of channel selection scheme provided at the base station controller BSC which selects the most suitable radio channel according to the MS capabilities (i.e., if MS is using some IC technique the allocation is performed taking into account IC gains using DIR information). It will be appreciated that the functional components illustrated in FIG. 2 can be implemented as functional blocks or as a computer program or in any appropriate software/hardware combination.

The scheme of FIG. 2 shows a DIR calculation block 12 for calculating the DIR, and a CIR calculation block 14 for estimating the carrier to interference ratio CIR. An IC gain block 16 calculates the interference calculation gain from the DIR. This can be achieved using a function $IC_{gain}$ (DIR) that returns the $IC_{gain}$ for a certain DIR. This gain is used to correct CIR estimation at CIR correction block 15 in order to take into account link level enhancement provided by the IC technique which is utilised in the system. It will be appreciated that an interference calculation technique of any known type will be implemented but this is not shown in FIG. 2.

Figure 3:
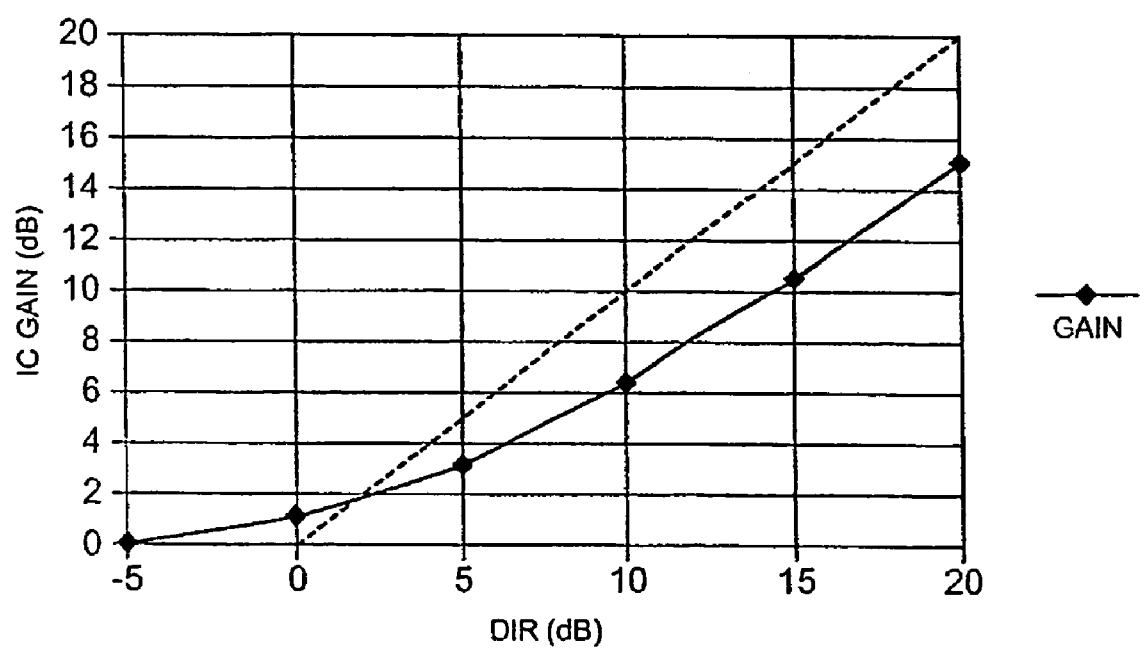
FIG. 3 is a diagram illustrating a function for determining IC gain from DIR.

An example of a function which may be used in IC gain block 16 is presented in FIG. 3. In order to select a channel, a number of radio channel candidates are evaluated in sequence by applying each one in turn to the CIR estimation block 14. Every channel is ranked according to the DIR and corrected CIR by means of some criteria discussed later (block 18 in FIG. 2). When all channels have been evaluated (block 19), the best one is finally selected (block 20) according to the specified criteria mentioned above.

The above-mentioned scheme is utilised if an interference cancellation technique is implemented at the mobile station MS, as determined at block 13. If it is not, conventional CIR estimation 14 and channel ranking 18 is carried out.

The manner in which a radio channel candidate is processed for selection will now be described. In the following description, it will be appreciated that the CIR estimations which are referred to are carried out in the CIR estimation block 14 and returned, where necessary, to the DIR estimation block 12 along the connection 28 for calculation of the DIR. However, it will readily be appreciated that the blocks in FIG. 2 are explanatory only, and that the invention could be implemented in any suitable manner, and in particular that blocks 12, 14 and 16 could be combined in a suitably programmed processor.

Calculation of 1-way DL CIR:

The 1-way downlink (DL) CIR without taking the IC gain into account can be calculated as follows:

$$\frac{C}{I_{1\text{-}wayDL}} = \frac{C}{\sum_{i=1}^{n}\left(I_{1\text{-}wayDL_i} - \text{PWR\_reduction}_{DL_i}\right)} \quad [2]$$

where C is the serving cell maximum downlink signal level and I is the downlink signal level of each interfering connection without taking the possible interfering connection downlink TX power reduction into account. The PWR_reduction is the current downlink TX power reduction employed by the interfering connection.

The 1-way DL CIR if the dominant interferer is ignored can be calculated as follows:

$$\frac{C}{I_{1\text{-}wayDL\_non\text{-}dom}} = \frac{C}{\sum_{i=1}^{n}\left(I_{1\text{-}wayDL_i} - \text{PWR\_reduction}_{DL_i}\right) - \left(I_{1\text{-}wayDL_{dom}} - \text{PWR\_reduction}_{DL_{dom}}\right)} \quad [3]$$

These CIR measurements are supplied to the DIR calculation block 14 where the 1-way DL DIR can now be calculated as follows:

$$DIR_{1\text{-}wayDL} = \frac{C}{I_{1\text{-}wayDL}} - \frac{C}{I_{1\text{-}wayDL\_non\text{-}dom}} \quad [4]$$

The gain of the used IC technique can is determined as a function of the DIR in $IC_{gain}$ block 16, as described above. The function of FIG. 3 is used when the possible initial power reduction to be applied on the allocated channel is determined as follows:

$$\text{PWR\_reduction}_{DL_{new\_ch}} = \min \quad [5]$$

$$\left(\frac{C}{I_{1\text{-}wayDL}} + IC_{gain}(DIR_{1\text{-}wayDL}) - \frac{C}{I_{target\_DL}}, \text{PWR\_reductionmax}_{DL}\right)$$

where $C/I_{target}$ is the CIR that is preferred for the new connection and the $PWR_{\_reductionmax\_DL}$ is the maximum allowed DL TX power reduction. The difference of the provided CIR on the new channel (IC gain included) from the preferred CIR ($C/I_{target}$) can be calculated as follows:

$$\frac{C}{I_{Diff\_1\text{-}way}} = \quad [6]$$

$$\frac{C}{I_{1\text{-}wayDL}} + IC_{gain}(DIR_{1\text{-}wayDL}) - \text{PWR\_reduction}_{DLnew\_ch} - \frac{C}{I_{Target\_DL}}.$$

This CIR difference shows the new channel DL CIR relative to the preferred CIR target. CIR difference of 0 means that the target CIR is achieved. A positive CIR difference indicates that CIR is higher than the CIR target and that the DL TX power is reduced to minimum. A negative CIR indicates that the channel DL CIR is below the CIR target and that the maximum DL TX power is used.

Calculation of 2-way DL CIR:

(these calculations are done for every ongoing connection (n) that can get interfered by the new connection)

The 2-way DL CIR can be calculated as follows:

$$\frac{C}{I_{2\text{-}wayDL\_PWR_n}} = \quad [7]$$

$$\frac{C}{I_{2\text{-}wayDL_n} - \text{PWR\_reduction}_{DL_n} + \text{PWR\_reduction}_{DL_{new\_ch}}}$$

Where $C/I_{2\text{-}wayDL}$ is the CIR that is estimated to impact the ongoing connection if the channel assignment is done using the radio channel that is currently being examined. The $C/I_{2\text{-}wayDL}$ can be obtained from the DL measurement report of the interfered connection or from the Background Interference Matrix (BIM) that includes a statistically determined CIR based on measurement report statistics.

The DIR of the interfered connection after the new channel assignment can be calculated as follows:

$$\text{if}\left(\frac{C}{I_{2\text{-}wayDL\_PWR_n}} \le \frac{C}{I_{2\text{-}wayDL\_old_n}}\right) \text{ then } DIR_{2\text{-}way\_new_n} = \quad [8]$$

$$\frac{C}{I_{2\text{-}wayDL\_old_n}} - \frac{C}{I_{2\text{-}wayDL\_PWR_n}}$$

$$\text{if}\left(\frac{C}{I_{2\text{-}wayDL\_PWR_n}} > \frac{C}{I_{2\text{-}wayDL\_old_n}}\right) \text{ then } DIR_{2\text{-}way\_new_n} =$$

$$\min\left(\frac{C}{I_{2\text{-}wayDL\_PWR_n}} - \frac{C}{I_{2\text{-}wayDL\_old_n}}, DIR_{2\text{-}way\_old_n}\right)$$

where $C/I_{2\text{-}way\_old}$ is the CIR experienced by the interfered connection prior to the new channel assignment and $DIR_{2\text{-}way\_old}$ is the DIR experienced by the interfered connection prior to the new channel assignment.

The CIR difference relative to the CIR target including the effect of the IC gain can now be calculated as follows:

$$\frac{C}{I_{Diff\_2\text{-}way_n}} = \min\left(\frac{C}{I_{2\text{-}way\_PWR_n}}, \frac{C}{I_{2\text{-}way\_old_n}}\right) - \frac{C}{I_{target\_2\text{-}way_n}} + IC_{gain}(DIR_{2\text{-}way\_new_n}) \quad [9]$$

Determination of the Most Restrictive CIR Difference and the Average DIR

After 1-way and 2-way calculations the most restrictive (minimum) CIR difference is determined as follows:

$$\frac{C}{I_{Diff\_min}} = \min\left(\frac{C}{I_{Diff\_1\text{-}way}}, \frac{C}{I_{Diff\_2\text{-}way_n}}\right) \quad [10]$$

The average DIR is calculated as follows block (12):

$$ave\ DIR = \frac{DIR_{1\text{-}way} + \sum_{i=0}^{n} DIR_{2\text{-}way\_new_i}}{n+1} \quad [11]$$

Channel Ranking

After the 1-way and 2-way calculations are performed for all available radio channel candidates they are ranked in the channel ranking block 20 according to the allocation preference order. Two possible ranking criteria are presented.

Criteria 1: This criteria is based on maximisation of both minimum CIR difference and average DIR by using adjustable weight factors a and b. However, if the minimum CIR difference for all the channel candidates is negative indicating that the CIR target is unreachable, then the channels are prioritised based on the minimum CIR difference only.

The criteria 1 can be expressed as follows:

$$\begin{cases} \max\left(a \cdot \dfrac{C}{I_{Diff\_min}} + b \cdot DIR\right) & \text{when } \dfrac{C}{I_{Diff\_min}} \geq 0 \\ \max\left(\dfrac{C}{I_{Diff\_min}}\right) & \text{when } \dfrac{C}{I_{Diff\_min}} < 0 \end{cases} \quad [12]$$

Criteria 2: This criteria aims for the maximisation of the average DIR in the network as long as the CIR target is achieved. If the CIR target is not achieved by any of the radio channel candidates then the channels are prioritised based on the minimum CIR difference only. Criteria 2 can be seen as a special case of the criteria 1 as it corresponds to the criteria 1 with the parameter a set to 0 and parameter b set to 1.

$$\begin{cases} \max(DIR) & \text{when } \dfrac{C}{I_{Diff}} \geq 0 \\ \max\left(\dfrac{C}{I_{Diff}}\right) & \text{when } \dfrac{C}{I_{Diff}} < 0 \end{cases} \quad [13]$$

As a result of applying the ranking criteria a channel ranking table showing the all the available radio channels and the determined ranking for each of them can be compiled. An example of such a ranking table is presented below, Table 1. The channel to be used for the channel allocation can then be selected from the table. The most preferred channel is the one that has the lowest ranking.

TABLE I

| TSL | MA | MAIO | Min C/I diff | ave DIR | PWR red (UL + DL) | ranking criteria 1 | ranking criteria 2 |
|---|---|---|---|---|---|---|---|
| 0 | 1 | 0 | 5 | 7 | 12 | 5 | 5 |
| 0 | 1 | 1 | 0 | 5 | 6 | 9 | 8 |
| 0 | 1 | 2 | 0 | 3 | 8 | 11 | 11 |
| 0 | 1 | 3 | −4 | 6 | 0 | 14 | 14 |
| 0 | 1 | 4 | 7 | 9 | 12 | 2 | 3 |
| 0 | 2 | 0 | 0 | 4 | 8 | 10 | 9 |
| 0 | 2 | 1 | 0 | 1 | 4 | 13 | 13 |
| 0 | 2 | 2 | 4 | 8 | 10 | 5 | 4 |
| 0 | 2 | 3 | 9 | 6 | 8 | 3 | 7 |
| 0 | 2 | 4 | 2 | 4 | 8 | 8 | 9 |
| 1 | 1 | 0 | 8 | 12 | 12 | 1 | 2 |
| 1 | 1 | 1 | −6 | 10 | 0 | 15 | 15 |
| 1 | 1 | 2 | 0 | 2 | 8 | 12 | 12 |
| 1 | 1 | 3 | 0 | 14 | 10 | 4 | 1 |
| 1 | 1 | 4 | 2 | 7 | 12 | 7 | 5 |

The above described system provides a number of advantages.

The gain provided by the utilised interference cancellation technique can be taken into account in the final CIR estimation for a radio channel candidate. This means that the channel selection can be based on an adjusted CIR in which the IC gain has been into account. Therefore, the channel selection is based on realistic CIR estimates, leading to more accurate channel selections and better network quality and/or higher network capacity.

The estimated DIR for a particular radio channel can be used in the selection criteria for the allocation process within a dynamic channel allocation functionality. This allows definition of selection criteria that aim to maximise the IC gain across the network, thereby allowing the benefits of interference cancellation to be exploited to the maximum extent. This likewise leads to better network quality and/or higher network capacity.

The invention claimed is:

1. A method, comprising:

establishing a radio channel candidate;

processing, by a controller, the radio channel candidate with potentially interfering signals using an interference cancellation technique and calculating a carrier to interference ratio for a selected carrier frequency of the radio channel candidate and the potentially interfering signals;

calculating, by the controller, at least one dominant interference ratio being the ratio of a signal level of a strongest potentially interfering signal with respect to a sum of signal levels of other potentially interfering signals;

using, by the controller, the dominant interference ratio to establish an indication as to an interference cancellation gain provided by the interference cancellation technique, the interference cancellation gain being used to establish a criteria for channel selection;

using, by the controller, the interference cancellation gain to modify the carrier to interference ratio; and using, by the controller, a criteria based on the dominant interference ratio and on the modified carrier to interference ratio in a channel selection process for selecting a channel for the connection to be established.

2. The method according to claim 1, wherein one of the criteria used in the channel selection process is a maximum value of a minimum difference between the calculated carrier to interference ratio and a target carrier to interference ratio.

3. The method according to claim 1, wherein one of the criteria used in the selection process is an average dominant interference ratio taken over a set of n connections which could be interfered with by the connection to be established.

4. The method according to claim 1, wherein the interference cancellation gain provided by the interference cancellation technique is established from the dominant interference ratio using a predefined function.

5. An apparatus, comprising:
an establisher configured to establish a radio channel candidate;
a first calculator configured to process the radio channel candidate with potentially interfering signals using an interference cancellation technique and to calculate a carrier to interference ratio based on a selected carrier frequency of the radio channel candidate and potentially interfering signals;
a second calculator configured to calculate a dominant interference ratio being a ratio of a signal level of a strongest potentially interfering signal with respect to a sum of the signal levels of other potentially interfering signals;
an interference cancellation gain indicator configured to use the dominant interference ratio to establish an indication as to an interference cancellation gain provided by the interference cancellation technique, the interference cancellation gain being used to establish a criteria for channel selection;
a modifier configured to use the interference cancellation gain to modify the carrier to interference ratio; and
a selector configured to implement a selection process for selecting a channel for a connection to be established using criteria based on the dominant interference ratio and on the modified carrier to interference ratio.

6. The apparatus according to claim 5, further comprising:
an interference canceller configured to apply the interference cancellation technique to the radio channel candidate and potentially interfering signals.

7. The apparatus according to claim 5, wherein the apparatus is configured to operate as part of a base station controller.

8. A system, comprising:
a plurality of stations, at least some of which comprise
an establisher configured to establish a radio channel candidate;
a first calculator configured to process the radio channel candidate with potentially interfering signals using an interference cancellation technique and to calculate a carrier to interference ratio based on a selected carrier frequency of the radio channel candidate and potentially interfering signals;
a second calculator configured to calculate a dominant interference ratio being a ratio of a signal level of a strongest potentially interfering signal with respect to a sum of the signal levels of other potentially interfering signals;
an interference cancellation gain indicator configured to use the dominant interference ratio to establish an indication as to an interference cancellation gain provided by the interference cancellation technique, the interference cancellation gain being used to establish a criteria for channel selection;
a modifier configured to use the interference cancellation gain to modify the carrier to interference ratio; and
a selector configured to implement a selection process for selecting a channel for a connection to be established using criteria based on the dominant interference ratio and on the modified carrier to interference ratio.

9. The system according to claim 8, wherein the system comprises a cellular communication network.

10. An apparatus, comprising:
means for establishing a radio channel candidate;
means for processing the radio channel candidate with potentially interfering signals using an interference cancellation technique and calculating a carrier to interference ratio based on a selected carrier frequency of the radio channel candidate and potentially interfering signals;
means for calculating a dominant interference ratio being a ratio of a signal level of a strongest potentially interfering signal with respect to a sum of the signal levels of other potentially interfering signals;
means for using the dominant interference ratio to establish an indication as to an interference cancellation gain provided by the interference cancellation technique, the interference cancellation gain being used to establish a criteria for channel selection;
means for using the interference cancellation gain to modify the carrier to interference ratio; and
means for implementing a selection process for selecting a channel for a connection to be established using criteria based on the dominant interference ratio and on the modified carrier to interference ratio.

11. The apparatus according to claim 10, further comprising:
means for applying the interference cancellation technique to the radio channel candidate and potentially interfering signals.

12. The apparatus according to claim 10, wherein the apparatus is configured to operate as part of a base station controller.

13. A computer program embodied on a computer-readable medium, the computer program configured to control a processor to perform operations comprising:
establishing a radio channel candidate;
processing the radio channel candidate with potentially interfering signals using an interference cancellation technique and calculating a carrier to interference ratio for a selected carrier frequency of the radio channel candidate and the potentially interfering signals;
calculating at least one dominant interference ratio being the ratio of a signal level of a strongest potentially interfering signal with respect to a sum of signal levels of other potentially interfering signals;
using the dominant interference ratio to establish an indication as to an interference cancellation gain provided by the interference cancellation technique, the interference cancellation gain being used to establish a criteria for channel selection;
using the interference cancellation gain to modify the carrier to interference ratio; and
using a criteria based on the dominant interference ratio and on the modified carrier to interference ratio in a channel selection process for selecting a channel for the connection to be established.

14. The computer program according to claim 13, wherein one of the criteria used in the channel selection process is a maximum value of a minimum difference between the calculated carrier to interference ratio and a target carrier to interference ratio.

15. The computer program according to claim 13, wherein one of the criteria used in the selection process is an average dominant interference ratio taken over a set of n connections which could be interfered with by the connection to be established.

16. The computer program according to claim 13, wherein the interference cancellation gain provided by the interference cancellation technique is established from the dominant interference ratio using a predefined function.

* * * * *